UNITED STATES PATENT OFFICE.

OSCAR BALLY, OF MANNHEIM, GERMANY, ASSIGNOR TO THE BADISCHE ANILIN AND SODA FABRIK, OF LUDWIGSHAFEN, GERMANY.

DIBROM ANTHRAQUINONE DERIVATIVE AND PROCESS OF MAKING SAME.

SPECIFICATION forming part of Letters Patent No. 631,607, dated August 22, 1899.

Application filed April 12, 1899. Serial No. 712,764. (No specimens.)

*To all whom it may concern:*

Be it known that I, OSCAR BALLY, doctor of philosophy, a citizen of the Swiss Republic, residing at Mannheim, in the Grand Duchy of Baden and Empire of Germany, have invented new and useful Improvements in the Manufacture of Di-Brominated Derivative of 1.5-Diamido-Anthraquinone, (for which application for patent was made in Germany, No. 23,557, October 15, 1898,) of which the following is a specification.

I have discovered that 1.5-diamido-anthraquinone, on treatment with bromin, is converted into brom-substituted products. These are valuable as initial materials for the production of coloring-matters of the anthracene series.

I obtain my new brominated derivatives of 1.5-diamido-anthraquinone by treating this body in a solvent, such as glacial acetic acid, with an excess of bromin. According to the vigor with which the bromination is effected either di-bromo derivatives or a tri-bromo derivative is obtained, and in the present application for Letters Patent I desire to claim the process for the production of the di-bromo derivative and that product and I do not claim the tri-bromo derivative and the process for obtaining it, which form the subject-matter of a separate application of even date herewith, filed April 12, 1899, Serial No. 712,765.

The following example will serve to illustrate the manner in which the invention can be carried into effect and the brominated compounds obtained.

Example: Make a suspension of about ten (10) parts of 1.5-diamido-anthraquinone in about two hundred (200) parts of glacial acetic acid. Add to the mixture at the ordinary temperature about twenty (20) parts of bromin and stir at the ordinary temperature for about twenty-four hours. A new brominated compound, which is with difficulty soluble in glacial acetic acid, separates out and can be collected by filtering. In the dry state it constitutes a brick-red powder, which can be dissolved and crystallized from toluene. It is rather difficultly soluble in alcohol and glacial acetic acid, more easily soluble in toluene, benzene, and nitro-benzene, giving yellow-brown solutions.

Now what I claim is—

1. The process for the production of a dibrom-1.5-diamido-anthraquinone by treating 1.5-diamido-anthraquinone at the ordinary temperature with bromin, in the presence of a solvent, substantially as hereinbefore described.

2. As a new article of manufacture, the dibromo-diamido-anthraquinone which crystallizes from toluene in brown leaflets, and is rather difficultly soluble in alcohol and glacial acetic acid, more readily in toluene, benzene and nitro-benzene, giving yellow-brown solutions.

In testimony whereof I have hereunto set my hand in the presence of two subscribing witnesses.

OSCAR BALLY.

Witnesses:
ERNEST F. EHRHARDT,
J. L. HEINKE.